United States Patent [19]

Lyakhevich et al.

[11] Patent Number: 4,552,621

[45] Date of Patent: Nov. 12, 1985

[54] APPARATUS FOR THERMAL DECOMPOSITION OF POLYMERIC MATERIALS

[75] Inventors: Genrikh D. Lyakhevich, Minsk; Anatoly P. Khimanych, Bobruisk; Vasily G. Suzansky, Bobruisk; Vulf P. Kovalerchik, Bobruisk, all of U.S.S.R.

[73] Assignee: Belorussky Politekhnichesky Institut, Minsk, U.S.S.R.

[21] Appl. No.: 505,277

[22] Filed: Jun. 17, 1983

[51] Int. Cl.[4] .............................................. C10B 1/00
[52] U.S. Cl. .................................... 202/84; 196/14.52; 196/122; 201/2; 201/20; 201/25; 201/30; 202/241; 585/241
[58] Field of Search ................. 202/84, 208, 209, 215, 202/241; 201/10, 20, 25, 30, 2; 585/241, 240; 422/901; 196/14.52, 122; 208/48 R

[56] References Cited

U.S. PATENT DOCUMENTS

| | | | |
|---|---|---|---|
| 2,685,555 | 8/1954 | Findlay | 201/30 |
| 3,574,558 | 4/1971 | Vermeulen et al. | 196/14.52 |
| 4,175,211 | 11/1979 | Chen et al. | 201/25 |
| 4,384,150 | 5/1983 | Lyakhevich et al. | 585/241 |

FOREIGN PATENT DOCUMENTS 49-002878  1/1974  Japan .................................. 585/240

Primary Examiner—Jay H. Woo
Assistant Examiner—M. McGurk
Attorney, Agent, or Firm—Fleit, Jacobson, Cohn & Price

[57] ABSTRACT

An apparatus comprises a reaction chamber provided with a charging hole, a branch pipe for discharging a suspension, and a branch pipe for withdrawing a vapor-gas phase which branch pipe is communicated with a condenser. The apparatus further includes a heater provided with a heat-exchanger for preheating a solvent, said heat-exchanger being introduced into said heater and communicated with said reaction chamber through nozzles adapted for jet feeding of the solvent into the reaction mass.

At the outlet of the reaction chamber there is mounted a distillation column communicated with the branch pipe for discharging the suspension and provided in the upper portion thereof with a branch pipe for withdrawal of the vapor-gas phase, while in the lower portion thereof there is provided a branch pipe for discharging a distillation residue.

9 Claims, 8 Drawing Figures

APPARATUS FOR THERMAL DECOMPOSITION OF POLYMERIC MATERIALS

BACKGROUND OF THE INVENTION

1. Field of the Invention

The invention relates to process equipment for refining high-molecular-weight compounds, namely to apparatus for a thermal decomposition of polymeric materials. The invention may prove most advantageous in chemical, petrochemical and petroleum refining industries when utilizing such materials as vulcanized and nonvulcanized rubbers, polyethylene, polystyrene, polypropylene etc.

2. Description of the Prior Art

Oil deficiency has recently provoked a need to search for other sources of raw materials for producing products originally obtained from oil.

Due to this fact, research workers have paid special attention to utilization and refining of waste polymeric materials, the annual amount of such wastes being more than 10 million tons. Up to now, the problem of expanding the range of upgrading the quality of products obtainable by refining waste polymeric materials, has preserved its urgency. A solution of this problem depends to a great extent on the design of the equipment utilized in refining polymeric materials.

Known in the art is an apparatus for refining polymeric materials, comprising a reactor, a mixing chamber, and a heater (USSR Inventor's Certificate No. 137,441). This apparatus is used essentially for producing bitumen from asphaltic bitumen, and is practically unsuitable for refining such polymeric materials as rubbers, polyethylene and the like.

Also known in the art is an apparatus for a thermal decomposition of polymeric materials, possessing wider processing possibilities (Lyakhevich G. D. et al., Issledovaniya protsessa termokhimicheskoy pererabotki uglei i nefteproduktov, "Izvestiya Akademii nauk Belorusskoi SSR", seriya khimicheskikh nauk, 1974, No. 3, pp. 88–90).

The above apparatus comprises a reaction chamber provided with a charging hole, a branch pipe for discharging a suspension, and with a branch pipe for withdrawing a vapour-gas phase, the latter being communicated with a condenser. The reaction chamber is constructed in the form of a vertical cylinder and is mounted within a heater in the form of an electric furnace. Within the reaction chamber there is installed a vertical shaft provided with blades, said shaft being connected with a rotation drive.

In the process of refining polymeric materials, finely divided raw material is charged into the chamber through the above-mentioned charging hole. A solvent is poured through the same hole and after charging and mixing are over, the heater is switched on. If such a sequence of operations is not observed, the reaction mass will inevitably coke and sinter. Therefore, the apparatus cannot operate in the continuous mode, which combined with a low process rate, adversely effects its efficiency. The range of products obtained in the apparatus is limited due to the fact that the processes of a thermal decomposition of a starting raw material and distillation for the separation of the end products are carried out practically within a single volume, i.e. reaction chamber. It is obvious that such an arrangement does not provide the possibility of selecting optimum conditions for the given processes. As a result, the quality of obtained end products is often unsatisfactory.

It should be also noted that with the given design of the apparatus, the attempt to expand the range of the obtained end products by means of increasing the distillation temperature or by increasing the duration of this operation is useless since it inevitably results in coking the reaction mass, choking and increased wear of the equipment.

SUMMARY OF THE INVENTION

The object set forth is attained by way of an apparatus for a thermal decomposition of polymeric materials, comprising a reaction chamber provided with a charging hole, a branch pipe for discharging a suspension, and with a branch pipe for withdrawing a vapour-gas phase, the latter being communicated with a condenser. A heater, according to the invention, is provided with a heat-exchanger for preheating a solvent, said heat-exchanger being introduced into the heater and communicated with the reaction chamber by means of nozzles designed for a jet feeding of the solvent into the reaction mass. At the outlet of the reaction chamber there is installed a distillation column communicated with said branch pipe for discharging a suspension, and provided in the upper portion thereof with a branch pipe for removing the vapour-gas phase, while in the lower portion thereof there is provided a branch pipe for discharging a distillation residue.

Preheating the solvent and separate distillation allow the process variables to be regulated over a higher range, thereby making it possible to optimize process conditions depending upon features and properties of the end products being separated. As a result, it has become possible to substantially upgrade the quality and to expand the range of the obtained end products. Upgrading the quality is also promoted by the jet introduction of the heated solvent, ensuring homogenization of the reaction mass and intensifying the process.

The combination of the above factors has made it possible to accomplish a continuous decomposition of polymeric materials, and has positively influenced the apparatus capacity. The design features of the apparatus practically eliminate the possibility of coking the products of the thermal decomposition.

The experimental tests have demonstrated that using the inventive apparatus only in processing automobile tyres, it is possible to obtain such useful and valuable products as a filler suspension, furnace fuel oil, mastic, rubber softener, bitumen and the like.

It is advantageous from the economic point of view to communicate the branch pipe for discharging a suspension from the reaction chamber with the distillation column via the heat-exchanger introduced into the heater. Such an arrangement allows one common heater to be used for thermal decomposition as well as for distillation. Moreover, the higher the temperature of the suspension, the lower the viscosity thereof, and consequently, the lower the hydraulic resistance when displacing said suspension into the column. This results in decreasing energy expenditures for the drives of booster pumps.

It is desirable to communicate the heat-exchanger for preheating a solvent with the distillation column via the collector and the injectors. Feeding a solvent into the distillation column promotes a more rapid completion of the thermal decomposition process, and positively effects the apparatus capacity.

In order to increase reliability of the apparatus, to reduce the frequency and duration of preventive maintenance, and to cut down operation costs, it is expedient to install the above injectors over the whole height of the distillation column. The solvent being ejected from the injectors, strikes against the walls of the distillation column and forms a fluid film which washes off settling products of the thermal decomposition and distillation.

The most stable and effective protective film is formed in a modification of the apparatus wherein the injectors disposed above the level of interface between the phases, are installed along two ascending spiral lines.

To expand the range of separated end products, it is preferable that the apparatus be provided with a supplementary condenser communicated with the branch pipe for withdrawing a vapour-gas phase from the distillation column.

It is profitable from economic and technical points of view that the above supplementary condenser be communicated with the inlet of the heat-exchanger for preheating a solvent. Such an arrangement allows a portion of condensate to be utilized as a solvent in the process of a thermal decomposition.

To prevent choking the nozzles and the injectors with the products of the thermal decomposition and with technical impurities, it is expedient that the apparatus be provided with a main line for supplying under pressure an inert gaseous agent, said main line being communicated with the nozzles of the reaction chamber and with the injectors of the distillation column. The inert gaseous agent further promotes the removal of the residues of sulphurous gas during distillation, and upgrading the quality of the end products.

In the embodiment of the invention designed for processing finely divided automobile tyres and other reinforced materials it is expedient to communicate the branch pipe for discharging a suspension from the reaction chamber with the distillation column via a separator. Such an arrangement will make it possible to eliminate the possibility of occurence of an emergency situation caused by choking the system with undissolved reinforcing materials (e.g. cord and wire), and with undissolved pieces of a polymeric material.

The simplest in design and the most suitable is a modification of the apparatus wherein the separator is constructed in the form of an inclined conveyer with three groups of injectors mounted thereunder, the first of the above groups being communicated with the heat-exchanger for preheating a solvent, the second being communicated with a steam generator, while the third group is communicated with an air calorifier. Such a design will allow practically all the raw materials supplied for processing, to be utilized.

BRIEF DESCRIPTION OF DRAWINGS

The invention is further explained by the detailed description of embodiments thereof with reference to the accompanying drawings, in which.

DETAILED DESCRIPTION OF THE INVENTION

Figure 1:
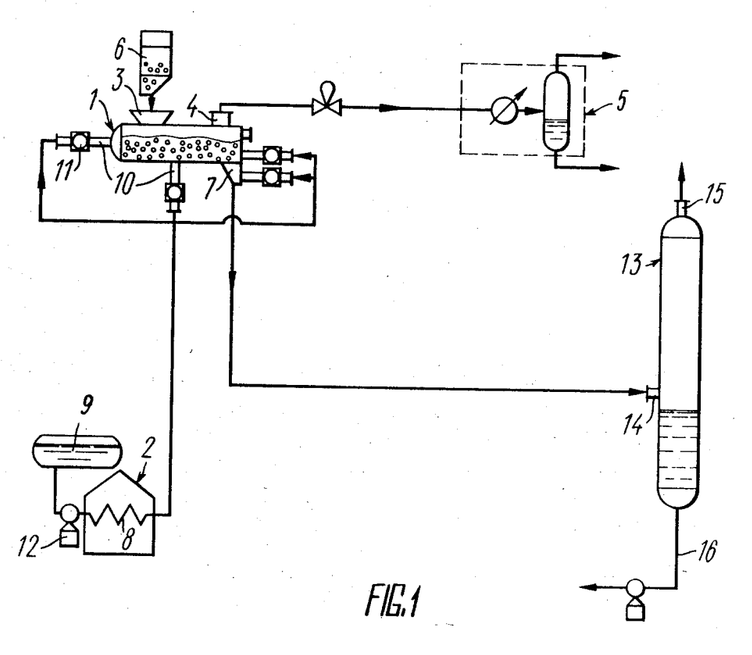
FIG. 1 shows a functional diagram of the apparatus for a thermal decomposition of polymeric materials.

An apparatus for a thermal decomposition of polymeric materials comprises a reaction chamber 1 and a heater 2 (FIG. 1). The reaction chamber 1 is made cylindrical and is mounted in a substantially horizontal plane, but with a slight inclination from the front end toward the rear end. In the upper portion of the chamber 1 there is provided a charging hole 3 constructed in the form of a hopper, and a branch pipe 4 for withdrawing a vapour-gas phase. The branch pipe 4 is communicated with a condenser 5. Above the charging hole 3 there is mounted a tank 6 for supplying a finely divided polymeric material. In the rear end of the reaction chamber there is provided a branch pipe 7 for discharging a suspension.

The heater 2 may be constructed in the form of an electric furnace, a gas furnace, infrared radiation sources, or to be of some other form, which in no way affects the invention. According to the present invention, the apparatus is provided with a heat-exchanger 8 for preheating a solvent. The heat-exchanger 8 is introduced into the heater 2. The inlet of the heat-exchanger 8 is communicated with a tank 9 filled with a solvent. The outlet of the heat-exchanger 8, according to the invention, is communicated with the reaction chamber 1 by means of nozzles 10 designed for jet feeding of the solvent into the reaction mass. Before the nozzles 10 there is installed an equalizing chamber 11. It is obvious that in order to obtain a jet feeding of a solvent, it is necessary to create a pressure gradient between the inlets and the outlets of the nozzles 10. For this end, booster pumps may be used. However, such a pressure gradient may be as well created without applying special attachments and assemblies. In particular, an elevated pressure at the inlets to the nozzles 10 may be ensured exclusively by increasing the pressure within the heat-exchanger 8 due to a partial separation of a vapour-gas phase from the solvent. For this reason, in the appended claims there is no such a point as "means for creating a pressure gradient at the inlets and the outlets of the nozzles". Nevertheless, it is desirable to install a booster pump at the inlet to the heat-exchanger 8.

Figure 2:
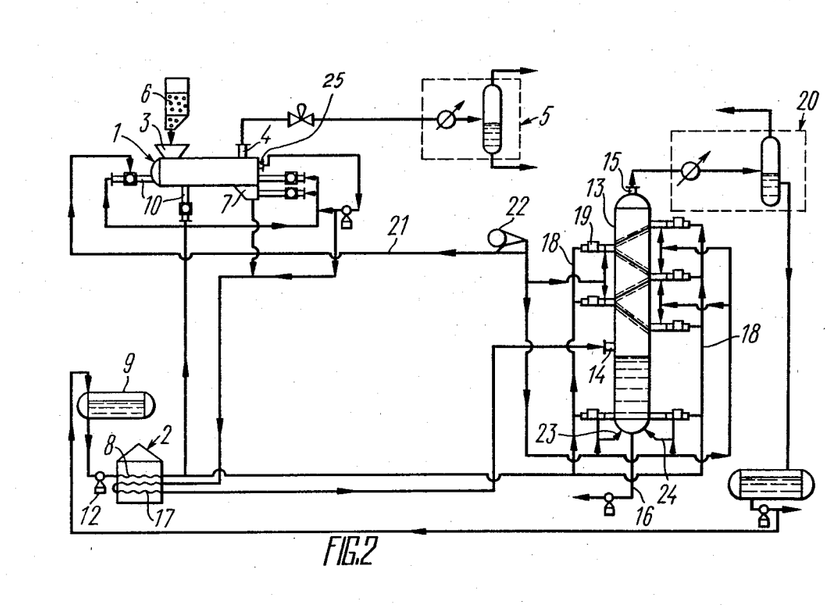
FIG. 2 schematically shows a modification of the apparatus having a supplementary heat-exchanger, a main line for supplying an inert gaseous agent, and with a partial recirculation of a solvent.

At the outlet from the reaction chamber 1, according to the invention, there is mounted a distillation column 13 communicated with the branch pipe 7 for discharging a suspension. The distillation column 13 is provided with an inlet branch pipe 14 disposed above the level of an interface between liquid and vapour-gas phases in the column. In the upper portion of the distillation column 13 there is provided a branch pipe 15 for withdrawing the vapour-gas phase, while in the lower portion thereof there is provided a branch pipe 16 for discharging a distillation residue. The branch pipe 15 is communicated with a vacuum pump (not shown). For illustrative purposes, this and other Figures of accompanying drawings show the direction of movement of the fluid along the main lines of the apparatus by means of arrows. Obviously, the reaction chamber 1 may be directly communicated with the distillation column 13, as shown in FIG. 1. However, the connection shown in FIG. 2 is more efficient to eliminate the installation of supplementary heaters. According to this modification, the branch pipe 7 for discharging a suspension is communicated with the distillation column 13 via a heat-exchanger 17. The heat-exchanger 17 and the heat-exchanger 8 are introduced into the one common heater 2.

To prevent depositing solid products of distillation onto the walls of the distillation column 13, and to intensify the process, in the modification of the apparatus shown in FIG. 2, the outlet of the heat-exchanger 8 for preheating a solvent is communicated via a collector 18 and injectors 19 with the distillation column 13. The injectors 19 are preferably mounted over the whole height of the distillation column 13.

Figure 3:
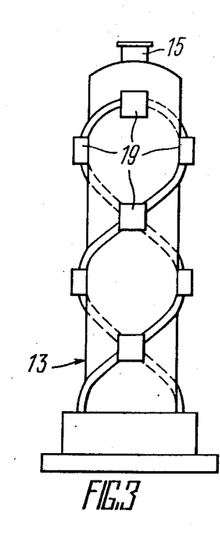
FIG. 3 shows an axonometric view of a distillation column provided with injectors installed along two ascending spiral lines.

As can be seen in FIG. 3 of the accompanying drawings, in a preferred embodiment of the invention, the injectors 19 disposed above the level of interface between the liquid and vapour gas phases, are mounted in the distillation column 13 along two ascending spiral lines.

It is expedient that the apparatus (FIG. 2) be provided with a supplementary condenser 20. The supplementary condenser 20 is communicated with the branch pipe 15 for withdrawing a vapour-gas phase from the distillation column 13. The condenser 20 will not only allow the range of the separated end products to be expanded, but will also provide for the possibility of utilizing a portion of distillation fractions as a solvent. For this end, the supplementary condenser 20 is communicated with the inlet of the heat-exchanger 8 for preheating a solvent.

According to another modification of the apparatus, the latter is provided with a main line 21 (FIG. 2) for supplying under pressure an inert gaseous agent. The main line 21 is communicated with a source 22 of the inert gaseous agent. Such devices as a steam generator, a compressor, compressed gas balloons (containing nitrogen, carbon dioxide), an outlet branch pipe of an exhauster, etc.) may be used as the above source 22. The main line 21 is communicated with the nozzles 10 of the reaction chamber 1 and with the injectors 19 of the distillation column 13. Bubble-type emulsifiers 23 and 24 are introduced into the lower portion of the column 13, said emulsifiers being communicated with the main line 21 for supplying an inert gaseous agent.

The reaction chamber 1 may be provided with a shortclosed recirculation system providing for returning a portion of the suspension to the reaction mass, and for using said suspension as a solvent. For this purpose, in the outlet end of the chamber 1 there is provided a pipe 25 serving, together with the branch pipe 7, for discharging the suspension, but being further connected to the nozzles 10.

Figure 4:
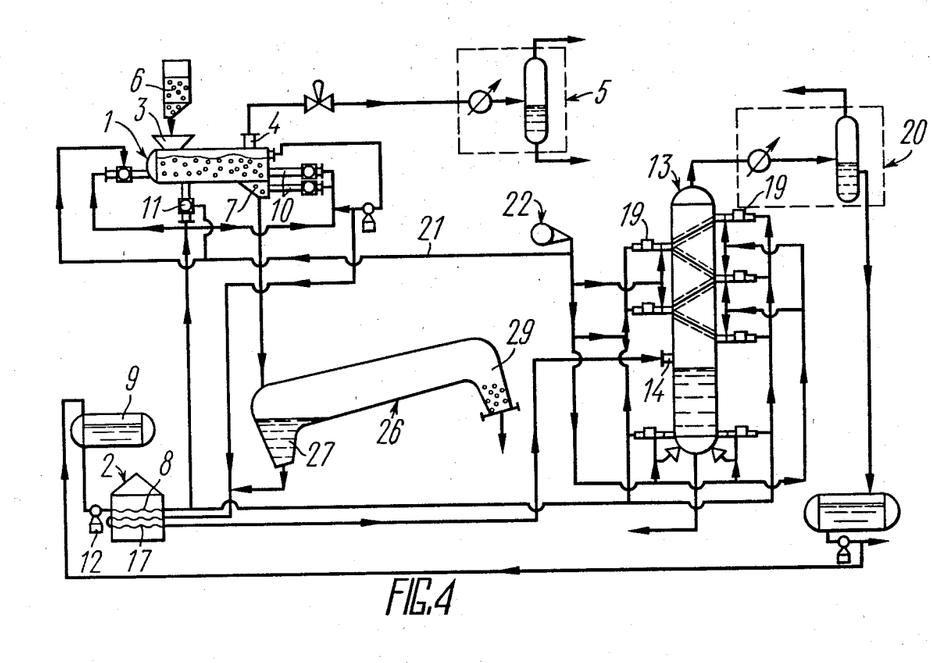
FIG. 4 schematically shows a modification of the apparatus having a separator.

To accomplish refining of reinforced polymeric materials, a preferred embodiment of the apparatus is shown in FIG. 4 of the accompanying drawings. According to this modification, the branch pipe 7 for discharging a suspension from the reaction chamber 1 is communicated with the distillation column 13 via a separator 26. In this case it is possible to successfully refine such reinforced materials as finely divided automobile tires without preliminary extracting of the cord. The separator 26 is provided with a discharging branch pipe 27 communicated via a pump 28 (FIG. 5) with the inlet of the heat-exchanger 17. The separator 26 is further provided with a branch pipe 29 for discharging separated solid particles, and with a branch pipe 30 (FIG. 5) for removing a vapour-gas phase. The branch pipe 30 is communicated with the condenser 5.

It will be understood that a conventional separator 26 (centrifugal, vibration, filter etc.) may be applied for separating solid particles. However, in a preferred modification the separator 26 (FIG. 5) is made in the form of an inclined conveyer 31. Above the inclined conveyer 31 there are mounted in series three groups of injectors 32, 33, and 34. The first group of the injectors 32 is communicated with the outlet of the heat-exchanger 8 for preheating a solvent. The second group of the injectors 33 is communicated with a steam generator 35 which in this case is used as the source 22 of an inert gaseous agent. The third group of injectors 34 is communicated with an air calorifier 36. A driving pulley 37 of the inclined conveyer 31 is connected with a rotation drive (not shown).

Figure 6:
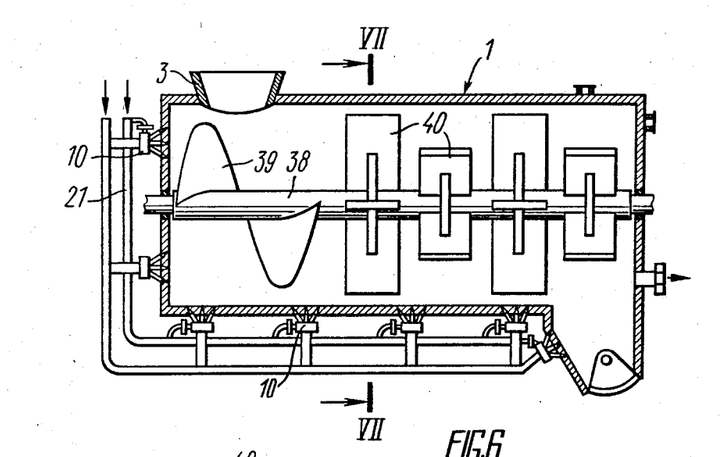
FIG. 6 shows a longitudinal axial sectional view of a preferred modification of the reaction chamber.

The nozzles 10 connected to the reaction chamber 1 provide for a sufficiently good stirring of the reaction mass by solvent jets. However, it is desirable that within the reaction chamber be mounted a horizontal shaft 38 (FIGS. 6, 7) provided with a screw conveyer 39 and blades 40. The dovetail of the horizontal shaft 38 is connected with a rotation drive (not shown). FIG. 6 clearly demonstrates that in order to improve homogenization of the reaction mixture, the nozzles 10 are provided at the outlets thereof with divided inner conduits.

Figure 8:
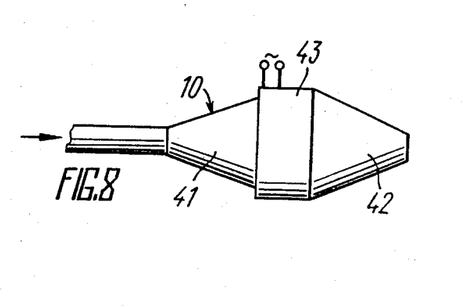
FIG. 8 schematically shows a longitudinal axial sectional view of a preferred embodiment of the nozzle of the reaction chamber.

In order to supply a solvent into the reaction chamber 1 it is preferred to use the nozzles 10, the design of such a nozzle being shown in FIG. 8. This nozzle consists of two parts: an expanding inlet portion 41 and a contracting outlet portion 42.

In the region of joining the portions 41 and 42 the nozzle is embraced by an ultrasonic oscillator 43. The oscillator 43 is designed for creating conditions promoting the occurence of cavitation conditions within the stream of a solvent.

The above described apparatus operates as follows.

A finely divided polymeric material is continuously fed from the tank consumption 6 (FIG. 1) through the charging hole 3 into the reaction chamber 1. Simultaneously, a solvent is fed to the nozzles 10 from the tank 9, passing through the heat-exchanger 8. Within the heat-exchanger 8, a solvent is heated to a temperature ranging from 150° to 500° C. The heated solvent is ejected through the nozzles 10 in the form of jets into the reaction chamber 1. The solvent jets intensively stir the polymeric material. As a result of the heat exchange between the solvent and the polymeric material, the latter is heated up to a temperature of thermal decomposition. The process of thermal decomposition of the polymeric material proceeds in the medium of a solvent which promotes breaking the bonds between macromolecules, under the conditions of intensive circulation of the solvent within the reaction mass. In the process of thermal decomposition volatile and low-boiling products are separated from the reaction mixture in the vapour-gas state, said products being removed through the branch pipe 4 into the condenser 5 (for utilization thereof). As the reaction mass moves from the front end of the reaction chamber 1 towards the rear end thereof, it transformates almost completely into the liquid state and forms a suspension. The resulting suspension is discharged through the branch pipe 7 and is supplied through the inlet branch pipe 14 into the distillation column 13. Within the distillation column 13, the process of thermal decomposition is completed, and there occurs distillation of a range of the formed fractions. The vapour-gas phase being separated, is removed for utilizing and obtaining the end products through the branch pipe 15. The distillation residue containing heavy high-boiling fractions and a filler, is poured off from the distillation column 13 through the branch pipe 16, and may be used as an end product (a filler, bitumen, an additive to vulcanizates, and the like).

The modification of the apparatus illustrated in FIG. 2 of the accompanying drawings operates substantially as described above. For this reason only the features of operation associated with the design improvements, are described below. In particular, one of such features consists in that the suspension is fed from the reaction chamber 1 into the heat-exchanger 17 where it is heated to the distillation temperature, and is fed into the distillation column 13.

Another feature of the operation of the modification shown in FIG. 2 lies in that a portion of the heated solvent is fed from the heat-exchanger 8 through the nozzles 19 into the distillation column 13. Such an arrangement promotes a more complete decomposition of the polymeric materials and substantially intensifies the process. The solvent being ejected from the nozzles 19, forms a movable fluid film over the inner surface of the walls of the distillation column 13, said fluid film washing off solid products of distillation which settle onto said walls. The arrangement of the nozzles 19 illustrated in FIG. 3, promotes the rotation of the fluid film and the flow without separation over the inner surface of the column 13 above the level of the interface between the liquid and vapour gas phases.

From the distillation column 13, the vapour-gas phase is fed into the supplementary condenser 20. The end products are extracted from a portion of the condensate. The other portion of said condensate is fed into the heat-exchanger 8 through the tank 9 and is used as a solvent.

The source 22 continuously supplies an inert gaseous agent into the main line 21. From the main line 21 the inert gaseous agent is supplied to the nozzles 10 and to the injectors 19. Supplying the inert gaseous agent under pressure minimizes the possibility of choking the nozzles 10 and the injectors 19 with the products of the thermal decomposition. Moreover, while being supplied into the distillation column 13, the inert gaseous agent promotes a rapid removal of the residues of sulphurous gas formed during the thermal decomposition of the vulcanizates. A portion of the inert gaseous agent is fed from the main line 21 into the distillation column via the bubble-type emulsifiers 23 and 24, thereby considerably intensifying the process.

Figure 5:
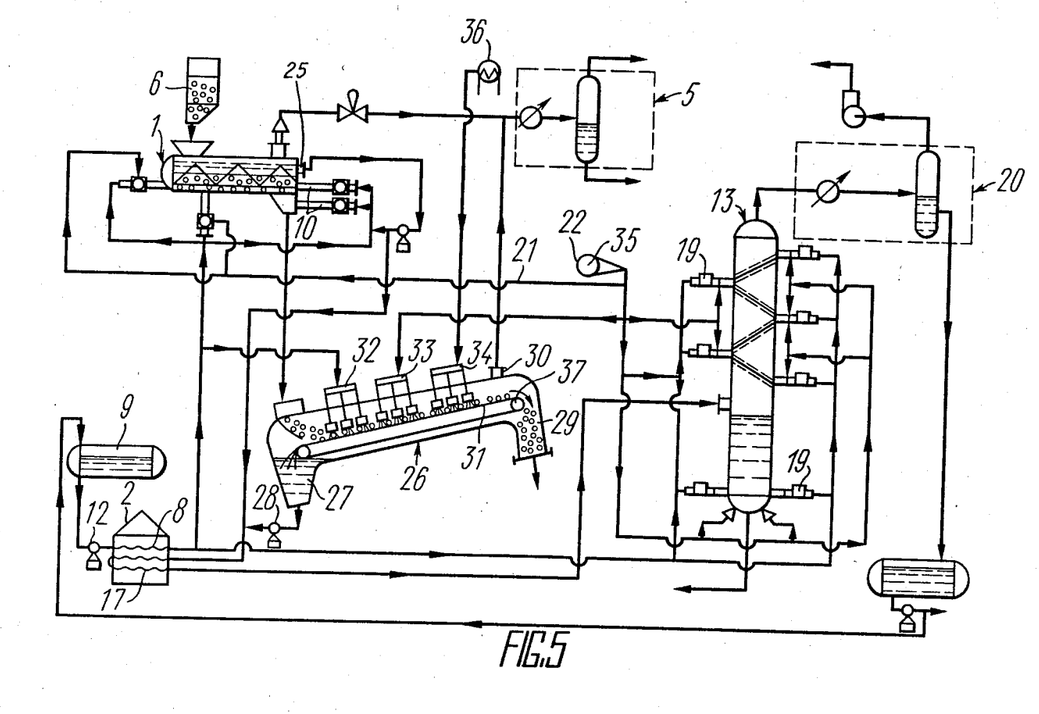
FIG. 5 schematically shows a preferred modification of the apparatus allowing separated mechanical admixtures to be washed and dried.

The modification of the apparatus illustrated in FIGS. 4, 5 of the accompanying drawings operates in a manner similar to that described above. However, prior to distillation, the suspension is fed from the branch pipe 7 into the separator 26. Flowing upon the inclined conveyer 31 of the separator 26 the suspension is separated. Large pieces of undissolved material, metallic wire, pieces of cord, and heavy mechanical admixtures remain on the conveyer, while the liquid containing light particles, e.g. rubber filler, flows down through the discharging branch pipe 27. The pump 28 (FIG. 5) pumps the suspension from the branch pipe 27 to the inlet of the heat-exchanger 17. After having passed through the said heat-exchanger 17, the suspension flows to the distillation column 13.

The above mechanical impurities are transported by means of the conveyer 31 and are successively subjected to three kinds of processing, i.e. to flushing with the solvent, accomplished through the injectors 32, to steaming by the injectors 33, and to drying carried out by the injectors 34. Dried mechanical impurities are poured off from the conveyer 31 through the branch pipe 29 for discharging. Vapours and gases being separated during the step of flushing, are removed from the separator 26 along the branch pipe 30 (FIG. 5) and into the condenser 5.

Figure 7:
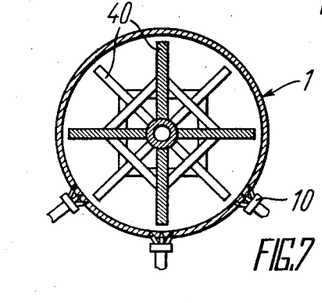
FIG. 7 shows the sectional view of the reaction chamber taken along the line VII—VII in FIG. 6.

The reaction chamber 1 illustrated in FIGS. 6 and 7 operates in the above described apparatus substantially as described above. However, as the horizontal shaft 38 rotates, the screw conveyer 39 and the blades 40 promote stirring, homogenization, and directional displacement of the reaction mass within the chamber 1.

The process of the thermal decomposition is substantially intensified when utilizing the nozzle 10 whose design is shown in FIG. 8 of the accompanying drawings. Changes in the cross-section of the nozzle 10 and the effect of ultrasound oscillations create conditions for occurence of cavitation. Micro-bubbles are formed within the solvent passing through the nozzle 10, vapours and gases being intensively emanated into said micro-bubbles.

The solvent being saturated with such bubbles and with gas caverns, interacts more intensively with the reaction mass.

While particular embodiments of the invention have been shown and described, various modifications may be made in the invention without departing from the spirit thereof as set forth in the appended claims.

What is claimed is:

1. Apparatus for the thermal decomposition of polymeric material containing solid impurities, which comprises:

reaction chamber means for thermally decomposing the polymeric material and forming a suspension containing the polymeric material and the solid impurities;

separator means for removing the solid impurities from the suspension, the separator means being located downstream from the reaction chamber means and being in communication with the reaction chamber means for receiving the suspension therefrom;

the separator means including an inclined conveyor having an upper and a lower end, with the inclined conveyor receiving the suspension containing the polymeric material from the reaction chamber means adjacent the lower end of the conveyor such that the suspension and polymeric material in the suspension flow off and are discharged from the lower end of the conveyor, and such that the conveyor transports the solid impurities upward for discharge from the upper end of the conveyor; and distillation means for further thermally decomposing the polymeric material, the distillation means being in communication with the separator means for receiving the suspension from the separator means after the solid impurities have been removed from the suspension by the inclined conveyor of the separator means.

2. Apparatus as claimed in claim 1, which further comprises:
heater means for preheating a solvent, and
injector means in communication with the heater means and mounted adjacent the inclined conveyor for flushing the solid impurities on the conveyor with the preheated solvent.

3. Apparatus as claimed in claim 2, in which the injector means is mounted adjacent the lower end of the inclined conveyor, and which further comprises:
a steam generator;
an air calorifier;
second injector means in communication with the steam generator and mounted adjacent an intermediate portion of the inclined conveyor for steaming the solid impurities on the conveyor; and
third injector means in communication with the air calorifier and mounted adjacent the upper end of the inclined conveyor for drying the solid impurities on the conveyor.

4. Apparatus as claimed in claim 3, in which:
the distillation means is a vertically disposed column having a lower liquid phase and an upper vapour gas phase; and
the vertically disposed column includes injector means in communication with the heater means for injecting the preheated solvent into the column, the injector means on the column above the liquid phase of the column being mounted along a plurality of ascending spiral lines to prevent the deposition of solid products on inner walls of the column in the vapour gas phase of the column.

5. Apparatus for the thermal decomposition of polymeric material, which comprises:
reaction chamber means for thermally decomposing the polymeric material and forming a suspension containing the polymeric material;
distillation means in the form of a vertically disposed column for further thermally decomposing the polymeric material, the distillation column being in communication with the reaction chamber means for receiving the suspension containing the polymeric material from the reaction chamber means, and the distillation column including a lower liquid phase and an upper vapour gas phase;
heater means for preheating a solvent; and
injector means in communication with the heater means and mounted on the vertically disposed distillation column for injecting the preheated solvent into the column, the injector means on the column being mounted along a plurality of ascending spiral lines to prevent the deposition of solid products on inner walls of the column in the vapour gas phase of the column.

6. Apparatus for the thermal decomposition of polymeric materials which comprises: a cylindrical reaction chamber having a front end, a rear end, an upper portion and a lower portion, said reaction chamber being disposed in a substantially horizontal plane with a slight inclination from said front end to said rear end; first and second branch pipes, said first branch pipe being disposed in said lower portion of said reaction chamber for discharging a suspension and said second branch pipe being disposed in said upper portion of said reaction chamber for withdrawing a vapour-gas phase; a condenser, said condenser being connected to said second branch pipe; a heater, said heater being provided with a heat-exchanger for pre-heating a solvent; nozzles communicating said heat exchanger with said reaction chamber for jet feeding said pre-heated solvent into said reaction chamber to intensively stir said polymeric materials; a distillation column which is communicated with said first branch pipe, the upper portion of said distillation column being provided with a first pipe for withdrawing a vapour-gas mixture and the lower portion of said distillation column being provided with a second pipe for discharging a residue; and multiple injectors disposed on said distillation column, said injectors being connected to said heat exchanger for injecting said pre-heated solvent into said distillation column to intensify the distillation and to prevent the deposition of solid products on the inner walls of said distillation column, said multiple injectors being disposed over the whole height of said distillation column and said injectors which are disposed above the level of the interphase between said vapour-gas phase and said suspension being mounted on said distillation column along two ascending spiral lines.

7. Apparatus as set forth in claim 6, wherein said branch pipe for discharging the suspension from said reaction chamber is communicated with said distillation column via a separator to remove solid impurities from said suspension.

8. Apparatus as set forth in claim 7, wherein said separator is constructed in the form of an inclined conveyer with three groups of injectors being mounted in series thereabove, the first of said groups being communicated with said heat exchanger for flushing said solid impurities with a solvent, the second of said groups being communicated with a steam generator for steaming said solid impurities, and the third of said groups being communicated with an air calorifier for drying said solid impurities.

9. Apparatus for the thermal decomposition of polymeric material containing solid impurities, which comprises:
reaction chamber means for thermally decomposing the polymeric material and forming a suspension containing the polymeric material and the solid impurities;
separator means for removing the solid impurities from the suspension, the separator means being located downstream from the reaction chamber means and being in communication with the reaction chamber means for receiving the suspension therefrom;
heater means for preheating a solvent;
injector means in communication with the heater means and mounted adjacent the separator means for flushing the solid impurities in the separator means with the preheated solvent; and
distillation means for further thermally decomposing the polymeric material, the distillation means being in communication with the separator means for receiving the suspension from the separator means after the solid impurities have been removed from the suspension by the separator means;
the distillation means being a vertically disposed column having a lower liquid phase and an upper vapour gas phase, and the vertically disposed column including injector means in communication with the heater means for injecting the preheated solvent into the column, the injector means on the column above the liquid phase of the column being mounted along a plurality of ascending spiral lines to prevent the deposition of solid products on inner walls of the column in the vapour gas phase of the column.

* * * * *